US005349151A

United States Patent [19]

Eisbrenner et al.

[11] Patent Number: 5,349,151

[45] Date of Patent: Sep. 20, 1994

[54] LOW IMPACT FLOW CONTROL DEVICE

[75] Inventors: Ronald J. Eisbrenner, Shelby Township. Macomb County; George V. Fantazian, Farmington Hills, both of Mich.

[73] Assignee: Savair Inc., St. Clair Shores, Mich.

[21] Appl. No.: 14,613

[22] Filed: Feb. 8, 1993

[51] Int. Cl.[5] .............................................. B23K 11/00

[52] U.S. Cl. ......................................... 219/89; 91/448; 91/461

[58] Field of Search .................... 219/117.1, 89, 86.33, 219/86.41, 86.51, 86.61; 91/444, 446, 448, 461

[56] References Cited

U.S. PATENT DOCUMENTS

| | | | |
|---|---|---|---|
| 3,129,320 | 4/1964 | Capaldo et al. | 219/89 |
| 3,497,660 | 2/1970 | Henry-Biabaud | 219/89 |
| 3,698,617 | 10/1992 | Fukaya et al. | 91/448 |
| 3,875,365 | 4/1975 | Beneteau | 219/89 |
| 3,925,635 | 12/1975 | Schneider | 219/89 |
| 4,135,076 | 1/1979 | Beneteau | 219/89 |
| 4,314,502 | 2/1982 | Brinkel et al. | 91/448 |
| 4,503,312 | 3/1985 | Nakata et al. | 219/117.1 |
| 4,579,042 | 4/1986 | Neff | 91/446 |
| 4,680,441 | 7/1987 | McKendrick | 219/91.1 |
| 4,733,042 | 3/1988 | Nishiwaki et al. | 219/89 |
| 4,955,283 | 9/1990 | Hidaka et al. | 91/461 |
| 5,032,704 | 7/1991 | Neff et al. | 219/89 |
| 5,046,309 | 9/1991 | Yoshino | 91/461 |
| 5,050,483 | 9/1991 | Yoshikawa et al. | 91/446 |
| 5,239,912 | 8/1993 | Kauss et al. | 91/448 |

FOREIGN PATENT DOCUMENTS

| | | |
|---|---|---|
| 63-2575 | 1/1988 | Japan . |
| 2063133 | 6/1981 | United Kingdom . |

*Primary Examiner*—Geoffrey S. Evans
*Attorney, Agent, or Firm*—Remy J. VanOphem

[57] ABSTRACT

A flow control system which is capable of selectively operating at least one pneumatic cylinder between high and low pressures. The flow control system allows the cylinder to engage a workpiece while under the influence of the lower pressure so as to minimize the impact on the workpiece, and thereafter subjects the cylinder to the higher pressure so as to increase the clamping load on the workpiece. Flow control is achieved by controlling the flow of high pressure air from a suitable source with a pilot-operated five ported four-way two-position control valve, a pressure regulator and a unidirectional flow control valve having an adjustable orifice. The pressure regulator is connected to one outlet port of the control valve such that the cylinder is initially supplied with air at the lower pressure when the control valve is in its normal operating position. Once the cylinder engages the workpiece, air pressure to the pilot sufficiently increases to spool the control valve to an actuated position, in which the higher air pressure provided by the supply source is delivered through the control valve to the cylinder. As a result, the clamping load of the cylinder on the workpiece is increased. The flow control system is particularly suitable for operating pneumatic cylinders which are used to actuate the electrodes of a welding gun.

20 Claims, 1 Drawing Sheet

LOW IMPACT FLOW CONTROL DEVICE

BACKGROUND OF THE INVENTION

1. Field of the Invention

The present invention generally relates to fluid control systems for controlling the extension and retraction of fluid-power actuators, or cylinders. More specifically, this invention relates to a flow control system which is capable of selectively operating a pneumatic cylinder between high and low pressures, such that the cylinder cooperates to engage and clamp a workpiece while under the influence of the lower pressure so as to minimize the impact on the workpiece, and thereafter be subjected to the higher pressure so as to increase the clamping load on the workpiece, wherein the pneumatic cylinder is particularly suitable for use in actuating a spot welding gun for the purpose of welding two or more relatively thin sheets of metal.

2. Description of the Prior Art

Fluid-power actuators, more commonly referred to simply as cylinders, are widely employed in both manual and automated operations where linear motion is useful. In automated operations, control systems for controlling fluid flow to and from a cylinder are typically necessary to either accurately limit the extension or retraction of the cylinder rod, or accurately control the stroking rate of the rod, or combinations thereof.

Cylinders used to actuate electric welding guns, such as resistance welding guns, are required to bring a pair of welding electrodes into contact with a workpiece to be welded. With the electrodes contacting the workpiece, the cylinders must apply a sufficiently high clamping pressure through the electrodes to the workpiece so as to ensure a proper weld. Generally, welding guns are often used on mass production assembly lines to permanently join two or more workpieces. Resistance welding guns are especially suited for use on mass production assembly lines, such as automated automobile assembly lines where body panels, doors, hoods, and their support structures are welded together to form subassemblies that, in turn, are subsequently welded to the frame or the unit construction of an automobile. Unit construction automobile bodies are themselves complex structures of stamped sheet metal sections which must be welded together to form a framework to which the outer body panels are attached.

Resistance welding is a process which, through the application of heat and pressure, coalesces two or more metal sheets or panels, without the use of fluxes or filler metals, to form a permanent joint. The necessary heat is generated by the resistance of the metal sheets to the flow of an electric current through the metal sheets. Conventional resistance welding guns include electrodes which serve as terminals for an electrical circuit. During the welding process, a pair of cylinders bring the electrodes into contact with opposite sides of the metal sheets to be welded so as to firmly clamp the workpieces together. An electric current is then passed through the electrodes and through the sheets.

The application of force through the electrodes is beneficial in that it assures a firm contact between the metal sheets being welding, and also assures that a sufficient electrical contact between the metal sheets and the electrodes is made. However, excessive force must be avoided where the metal sheets being welded are thin and, therefore, susceptible to deformation from excessive impact loads. This is particularly true in the automotive industry where the demand for lighter-weight vehicles has resulted in the use of sheet metal which has traditionally been about 0.035 inches thick, but more recently has become significantly thinner. In view of the high forces which must typically be applied by the cylinders to ensure short cycle times as well as sufficient contact between the electrodes and the sheet metal, deformation often becomes a reoccurring problem on automobile assembly lines.

Welding guns which are typically used on an automated assembly line typically include a pair of arms pivotably mounted to a base, with each arm being fitted with an electrode. A cylinder is attached to the movable arm to move the electrode into and out of position for welding. Due to the nature of the application, the movable electrode will typically come in contact with the workpiece prior to the fixed electrode as the cylinder is extended to bring the electrodes together. The initial impact is largely due to the high momentum and the associated dynamic forces required of the cylinder in order to quickly and firmly approach the metal sheet and clamp them together. The initial impact force is generally 2 to 4 times greater than the calculated force for any given cylinder. While this initial impact has not typically caused excessive deformation during assembly operations, with body panels in automobiles getting thinner, these loads have been found to cause unacceptable deformation of the body panels.

Several approaches for minimizing the adverse effect of the impact force generated by the cylinders have been suggested in the prior art. It has been suggested in the prior art that suitable results can be achieved by altering the construction of the cylinders themselves so as to reduce the actuation speed and initial clamping loads generated by the cylinders. However, a significant disadvantage to such an approach is that each welding operation may require a pair of cylinders which are specifically adapted for its purpose. As a result, not only are the cylinders relatively expensive in that they are customized to some degree, but the replacement of a cylinder on the assembly line mandates that the particular cylinder be kept in stock for each unique welding operation. Furthermore, it is not typically practical or desirable to reduce the actuation speed of the cylinders, in that slower speeds result in longer cycle times, which are highly undesirable in mass production operations.

Consequently, the prior art has often focused on flow control systems for operating a more or less standard pair of cylinders. Examples of the prior art directed to this approach include U.S. Pat. Nos. 3,497,660 to Henry-Biabaud, 4,579,042 to Neff, 4,680,441 to McKendrick, 4,733,042 to Nishiwaki et al., 5,032,704 to Neff et al., U.K. Patent Application 2,063,133 and Japanese Pat. 63-2575. Generally, each of the above seeks to operate a pair of cylinders under the influence of low pressure air until the electrodes are in proximity to or have contacted a workpiece, after which high pressure air is delivered to the cylinders to increase the clamping load on the workpiece prior to the actual step of welding the workpiece. While each of the above approaches may generally be capable of avoiding excessive impact of the electrodes against a workpiece, each shares the disadvantage of requiring a complicated and numerous assortment of control valves, pressure regulator valves, and/or computers with computer-interface control and sensing devices. As a result, initial cost and replacement costs can be rather high, as well as the time and costs involved in maintaining these complicated flow control systems.

From the above discussion, it can be readily appreciated that the prior art does not disclose an uncomplicated, low cost flow control system which is capable of regulating the manner in which a resistance welding gun is actuated to engage one or more workpieces, such that the electrodes of the welding gun engage and initially clamp the workpiece under the influence of a low impact force, and thereafter clamp the workpiece with a significantly higher clamping load.

Accordingly, what is needed is an economical flow control system which is capable of selectively operating a cylinder between high and low pressures, such that the cylinder cooperates to bring a corresponding pair of welding electrodes into engagement with one or more workpieces while under the influence of the lower pressure so as to minimize the impact on the workpieces, and such that the cylinder is thereafter subjected to the higher pressure so as to increase the clamping load on the workpieces. Such a flow control system would also be able to provide such capabilities with the use of a minimum number of flow control devices, such that the flow control device is relatively uncomplicated in construction and operation, so as to minimize costs and maintenance.

SUMMARY OF THE INVENTION

According to the present invention there is provided a flow control system for controlling the extension and retraction of a cylinder which is used to bring a pair of welding electrodes into contact with one or more workpieces to be welded. The flow control system enables the cylinder to be actuated under the influence of a relatively low fluid pressure while the electrodes are brought into engagement with the workpieces. As a result, the impact load applied by the electrodes on the workpieces is minimized so as to substantially avoid deformation of the workpieces. Once the cylinder has met resistance as a result of the electrodes having come into contact with the workpieces, the flow control system is capable of delivering fluid at a higher pressure to the cylinder so as to increase the clamping load on the workpieces, assuring firm contact between the workpieces while also assuring that a sufficient electrical contact between the workpieces and the electrodes is made. The flow control system of this invention is able to achieve these results, while being composed of a relatively few number of flow control devices which are placed in-line with the forward air line between a pressurized fluid source and the cylinder which serve to actuate the electrodes.

The flow control system primarily includes a pilot-actuated flow regulating device and a pressure regulating device. The flow regulating device is in fluidic communication with a suitable pressurized fluid source and a cylinder on which a corresponding movable electrode is mounted while a fixed electrode is on an oppositely disposed fixed surface. The flow regulating device operates between a first position and a second position such that pressurized fluid from the fluid source is delivered to the cylinder when the flow regulating device is in either the first or second position. When the flow regulating device is in the first position, fluid pressure as supplied by the fluid source is reduced downstream of the flow regulating device prior to being delivered to the cylinder. For this purpose, the pressure regulating device is located in-line between one outlet port of the flow regulating device and the cylinder to reduce the fluid pressure to a level which will rapidly extend the cylinder without excessively impacting the workpieces.

Once the electrodes have contacted the workpieces, pressure will sufficiently build up in the flow control system so as to cause the pilot associated with the flow regulating device to spool the flow regulating device to its second position. In this position, fluid pressure as supplied by the fluid source is delivered directly to the cylinder through the flow regulating device without being reduced. As a result of this higher pressure, the clamping load generated by the cylinder on the workpiece is significantly increased so as to assure that the workpieces are sufficiently clamped prior to being welding, while also assuring that an adequate electrical contact between the workpieces and the electrodes is made.

According to a preferred aspect of this invention, the flow control system is an in-line self-contained unit which is capable of converting a standard pneumatic cylinder into a low impact cylinder suitable for actuating a welding gun. Specifically, the flow and pressure regulating devices are each readily adjustable to allow for variances between different sizes of cylinders and different welding operations. When appropriately adjusted, the flow control system is capable of regulating air flow to the cylinder so that the electrodes will initially impact the workpieces with a relatively low load, such that deformation of the workpieces is substantially eliminated. Simultaneously, proper adjustment enables the flow control system to apply a suitably high clamping force on the workpieces immediately after the initial clamping load is achieved and prior to the actual welding of the workpieces, such that a proper weld is obtained. The flow control of this invention is capable of performing each of these functions while being limited to a compact, self-contained unit which can be readily installed and adapted to virtually any welding operation.

In addition, a significant advantage of the present invention is that the flow regulating device is able to appropriately regulate fluid flow to the cylinder to achieve the above advantages, while having a minimal effect on the speed and operation of the cylinder. Specifically, the use of a single flow regulating device for switching the cylinder between low and high operating pressures results in a faster responding system. As a result of the compact size of the flow control system, the flow regulating device can be placed in proximity to the cylinder, which serves to further enhance the response time of the flow control system and, thus, reduce the overall cycle time—encompassing the extend, weld and retract cycles—for the welding operation. Similarly, the flow regulating device also serves to rapidly vent fluid from the cylinders so as to further reduce the overall weld cycle.

Accordingly, it is an object of the present invention to provide a flow control system for regulating the operation of one or more cylinders, in which the flow control system is capable of selectively operating the cylinders between a first pressure and a relatively higher second pressure.

It is another object of the invention to provide a flow control system for regulating the operation of one or more cylinders in which the flow control system is capable of selectively operating the cylinders between a first pressure for advancing the cylinder rod to the workpiece and a second relatively higher pressure for performing work on the workpiece.

It is a further object of the invention that the flow control system be capable of operating the cylinders in a manner such that the cylinders cooperate to engage a workpiece while under the influence of the lower pressure so as to minimize the impact on the workpiece, and thereafter sufficiently clamp the workpiece under the influence of the higher pressure.

It is still a further object of the invention that the flow control system include a minimal number of flow control devices so as to minimize the size of the flow control system, while also allowing for a relatively uncomplicated and low-cost flow control system.

It is another object of the invention that one of the flow control devices be a regulating valve which can be operated to selectively deliver the lower and higher pressures in a rapid sequential manner to the cylinders, so as to minimize the cycle time for the cylinders.

It is yet another object of the invention that the flow control system be particularly suitable for use in actuating a spot welding gun used on an automated assembly line.

Other objects and advantages of this invention will be more apparent after a reading of the following detailed description taken in conjunction with the drawings provided.

DETAILED DESCRIPTION OF THE PREFERRED EMBODIMENT

Figure 1:
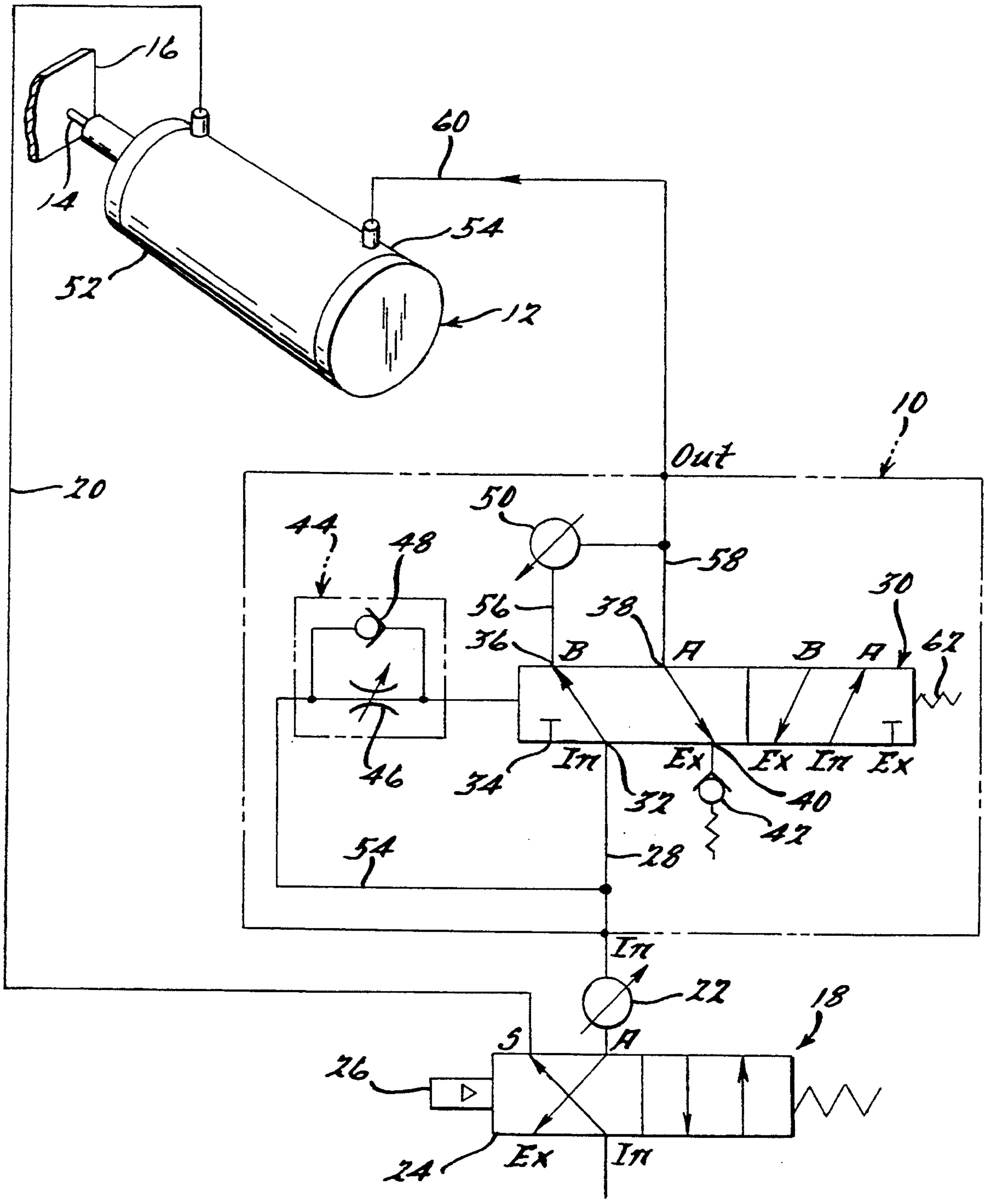
FIG. 1 is a schematic representation of a flow control system in accordance with the preferred embodiment of this invention.

With reference to FIG. 1, there is shown a schematic representation of a flow control system 10 in accordance with this invention. The flow control system 10 includes a pilot-actuated five ported four-way two-position valve 30, a unidirectional flow control valve 44 and a low pressure regulator 50, all of which are preferably plumbed into the operating environment as shown. Because the flow control system 10 is preferably composed of only three components, the flow control system 10 can be housed within a relatively small housing unit (not shown) which can be readily mounted within the operating environment.

As illustrated, the flow control system 10 is shown within the environment of a resistance welder of the type often used on an automated assembly line. It is understood that this preferred embodiment is not to be interpreted as a limitation, in that, the invention may be used in any application where it is required that the piston rod approach a workpiece under the influence of a low pressure, whereafter a higher pressure is applied to perform work on a workpiece, i.e., piercing of the metal sheet. Typically, such an application entails the use of one or more fluid-power actuators, or cylinders 12, only one of which is shown for purposes of clarity. A welding electrode 14 is actuated by the rod end of each cylinder 12 such that, when brought into contact with a workpiece 16, the electrodes 14 (only one of which is shown) cooperate to apply a clamping load on the workpiece 16. In that the workpiece 16 is typically two or more sheets of metal which are to be welded together, this clamping load is necessary to assure a firm contact between the metal sheets, as well as to provide proper electrical contact between the metal sheets and the welding electrodes 14.

Numerous variations on this welding apparatus are possible and completely foreseeable within the context of this invention. The following description of the flow control system 10 of this invention will specifically refer to its use within the above welding environment so as to facilitate a better understanding of the disclosure. However, the teachings of the present invention are not limited to the welding environment described, and can be readily adapted by one skilled in the art for use within other working environments where fluid pressure at different levels is intended to be sequentially delivered to one or more cylinders for the cylinder to perform work on a workpiece.

Conventionally, the working fluid used to actuate the cylinder 12 is a regulated supply of pressurized air. As illustrated, the supply of pressurized air is dispensed by an operating valve 18 which receives pressurized air from a suitable source, such as an air compressor (not shown). The operating valve 18 is preferably a solenoid-operates, five ported, four-way, two-position valve which is biased by a spring such that the valve's spool (not shown) resides in a normal operating position which causes the flow control system 10 to be vented to atmosphere through an exhaust port 24 in the operating valve 18. Simultaneously, the normal operating position of the operating valve 18 causes the supply of pressurized air to be delivered through a return line 20 to a retract side 52 of the cylinder 12 so as to fully retract the cylinder 12. Upon its associated solenoid 26 being energized, the operating valve 18 delivers the supply of pressurized air to a high pressure regulator 22 which regulates the pressure to a suitable operating pressure level. Typically, the supply of pressurized air will be available at a pressure level of about 100 psig, and then reduced to an operating pressure level of about 80 psig for delivery to the cylinder 12. Higher pressures may be used at times, particularly in Europe where operating pressure levels may be as high as about 140 psig.

From the high pressure regulator 22, the regulated air is delivered to the valve 30 through a supply line 28. As noted above, the valve 30 is preferably a five ported, four-way, two-position valve, as schematically represented in FIG. 1. A suitable valve for purposes of this invention is a Model L22PA4520 air-piloted five-ported four-way in-line valve available from Numatics, Inc., of Highland, Mich. Operation of the valve 30 within the flow control system 10 of this invention requires only a five-port capability. As a result, one port 34 of the Model L22PA4520 valve is capped, as schematically indicated, to provide the desired four port operation of the valve 30. Consequently, the valve 30 has an inlet port 32 to which a supply of air from the high pressure regulator 22 is delivered, an exhaust port 40, and first and second outlet ports 36 and 38, respectively, which selectively deliver the supply of air to the cylinder 12.

The valve 30 is schematically represented as being biased by a spring 62 such that, in the normal operating position, the supply of air enters the inlet port 32 and is delivered through the valve 30 to the first outlet port 36. The first outlet port 36 delivers the supply of air first to the low pressure regulator 50 through a low pressure line 56, and then on to an extend side 54 of the cylinder 12 through a forward line 60. The low pressure regulator 50 preferably reduces the pressure of the air to about 5 to about 15 psig, which is sufficient to rapidly extend the cylinder 12 without generating an excessively high impact force when the welding electrode 14 contacts the workpiece 16.

When the valve 30 is in the normal operating position, the second outlet port 38 is vented to the exhaust port 40 of the valve 30. Though the second outlet port 38 is also connected to the forward line 60 through a high pressure line 58 when the valve 30 is in its normal operating position, little air if any escapes through the exhaust port 40 during this period of time while the cylinder 12 is extending. One reason for this phenomenon is that the operation of the flow control system 10 is sufficiently rapid so as to minimize the amount of time the valve 30 is in its normal operating position, corresponding to a minimal amount of time which air has an opportunity to escape through the high pressure line 58 to the exhaust port 40. Another reason is that the extension of the cylinder 12 during this sequence of the cycle creates a path of least resistance for the air relative to the path defined by the high pressure line 58, the valve 30 and the exhaust port 40. Accordingly, the regulated air leaving the low pressure regulator 50 and the low pressure line 56 prefers to travel through the forward line 60 to the cylinder 12, instead of back through the high pressure line 58 to the valve 30.

Though optional, the exhaust port 40 can be provided with a pressure relief valve 42 so as to substantially eliminate any backflow leakage which may yet occur through the exhaust port 40 during the extension of the cylinder 12. Assuring that no air will escape through the exhaust port 40 while the cylinder 12 is extending serves to minimize the cycle time for the extension of the cylinder 12, thereby enhancing the overall cycle time for the welding operation. Generally, a maximum crack pressure of about 5 psig has been found to be sufficient to prevent the release of air during the extension cycle of the cylinder 12.

As noted above, the valve 30 is pilot-actuated between its normal operating position and an actuated position. The unidirectional flow control valve 44 serves to deliver the pilot pressure to the valve 30 for purposes of spooling the valve 30 between its normal operating position, as illustrated, and the actuated position. As will be discussed more fully below, the supply of air bypasses the low pressure regulator 50 when the valve 30 is in the actuated position by being delivered through the second outlet port 38 to the cylinder 12, such that higher air pressure is delivered to the cylinder 12, causing the clamping load generated by the cylinder 12 to substantially increase.

As shown, the unidirectional flow control valve 44 is fluidically in communication with the supply line 28. The unidirectional flow control valve 44 includes a variable orifice 46 and a check valve 48 to provide unidirectional operation of the variable orifice 46. Similar to the phenomenon discussed above, the valve 30, the first outlet port 36, the low pressure line 56 and the low pressure regulator 50 provide a path of least resistance during the extension cycle relative to the flow unidirectional control valve 44 due to the restriction created by the variable orifice 46. As a result, negligible air flow occurs through the variable orifice 46 during the period when the cylinder 12 is extending.

Inherently, some air may bleed through the variable orifice 46 during the extension cycle, but significantly greater air flow will only occur once the resistance to flow offered by the cylinder 12 is significantly increased. Such is the result when the welding electrode 14 contacts the workpiece 16. Once this occurs, air flow to the cylinder 12 is essentially prevented, and a substantial increase in air flow through the flow control valve 44 occurs. As a result, pressure will be allowed to build downstream of the variable orifice 46 over an extremely short period of time, on the order of about 0.1 seconds, such that the valve 30 will be spooled to the actuated position soon after the welding electrode 14 has engaged the workpiece 16. In effect, the variable orifice 46 serves as a timing device which determines the duration of time between the moment the welding electrode 14 impacts the workpiece 16 and the moment the valve 30 spools to its actuated position.

The variable orifice 46 is preferred over a fixed orifice in view of the fact that it is practically impossible to analytically predict the appropriate orifice size required for the proper operation of the flow control system 10. By example, if the orifice is too large, the valve 30 tends to spool to the actuated position prematurely, prior to the welding electrode 14 coming into contact with the workpiece 16. The result is that the welding electrode 14 will forcefully impact the workpiece 16, with the possible result of deforming the workpiece 16. At the other extreme, if the orifice is too small, the valve 30 spools to the actuated position much more slowly, causing an undesirable increase in the overall cycle time of the welding operation. In practice, it has been determined that the preferred unidirectional flow control valve 44 with the variable orifice 46 allows an operator to quickly achieve the desired operating parameters by making a simple adjustment of the variable orifice 46 during the course of several test cycles. A unidirectional flow control valve 44 which has been found to operate satisfactorily for this purpose is Model RFU-483-0200, available from Camozzi Pneumatics, Inc., of Dallas, Tex.

The invention will now be described in terms of the operation of the flow control system 10 within the welding environment depicted in FIG. 1. Essentially, one cycle will be described, the beginning of which is initiated by the operating valve 18 to extend the cylinder 12, and the end of which is signified by the complete retraction of the cylinder 12. The cycle can be generally described in terms of an initiation-to-impact sequence, an impact-to-clamping sequence, a weld sequence, and a retract sequence.

Prior to initiation, both the operating valve 18 and the valve 30 are in their respective normal operating positions, as schematically shown, in which the extend side 54 of the cylinder 12 is vented atmosphere through both the exhaust port 40 in the valve 30 and the exhaust port 24 in the operating valve 18. Simultaneously, high pressure air is delivered by the operating valve 18 to the retract side 52 of the cylinder 12 through the return line 20 so as to fully retract the cylinder 12.

At initiation, the solenoid 26 of the operating valve 18 is energized such that the operating valve 18 is spooled to deliver a pressurized supply of air to the high pressure regulator 22. Simultaneously, the retract side 52 of the cylinder 12 is vented to atmosphere through the return line 20 and the exhaust port 24. The high pressure regulator 22 reduces the pressure of the pressurized supply of air to a predetermined level, such as about 80 psig, and delivers the air through the supply line 28 to the inlet port 32 of the valve 30.

In the normal operating position, the valve 30 route the air out the first outlet port 36 and through the low pressure line 55 to the low pressure regulator 50, where the pressure level is further reduced to a suitable level.

As noted previously, a regulated lower pressure level of about 5 to about 15 psig has been found to be sufficient to rapidly extend the cylinder 12 without excessively impacting the workpiece 16 with the welding electrode 14. Air flow from the low pressure regulator 50 continues through the low pressure line 56 to the forward line 60, where it is delivered to the extend side 54 of the cylinder 12.

As previously discussed, the extension of the cylinder 12 offers a path of least resistance for the air as compared to the path defined by the high pressure line 58, the valve 30 and the exhaust port 40, particularly when the pressure relief valve 42 is used. Accordingly, though the second outlet port 38 of the valve 30 is also connected to the forward line 60 while being simultaneously vented to the exhaust port 40, little air if any escapes through the exhaust port 40 during the extension of the cylinder 12. Similarly, negligible air flow occurs through the variable orifice 46 of the unidirectional flow control valve 44 during this period when the cylinder 12 is extending, such that the pilot to the valve 30 does not see sufficient pressure to actuate the valve 30 until the cylinder 12 ceases to extend—i.e., the welding electrode 14 contacts the workpiece 16.

Under the influence of the low pressure air delivered by the low pressure regulator 50, the cylinder 12 rapidly extends, but without generating an excessive impact force which would otherwise deform the workpiece 16. Once the welding electrode 14 has contacted the workpiece 16, forward movement of the cylinder 12 is essentially halted. As a result, the air pressure downstream of the low pressure regulator 50—i.e., within the forward line and the extend side 54 of the cylinder 12—begins to rise until it equals that of the high limit of the pressure level delivered by the low pressure regulator 50—i.e., about 15 psig. At the same time, significantly greater air flow through the variable orifice 46 is initiated due to the rise in pressure to the supply pressure between the low pressure regulator 50 and the high pressure regulator 22, allowing pressure to build downstream of the variable orifice 46, such that the valve 30 is spooled to the actuated position soon after the welding electrode 14 has engaged the workpiece 16.

From the above sequence, two significant events have occurred. The first is that a rapid build-up of pressure has occurred downstream of the variable orifice 46, such that the valve 30 is spooled to its actuated position almost immediately after forward advancement of the cylinder 12 has ceased. The pressure build-up downstream of the variable orifice 46 and the resulting actuation of the valve 30 occur sufficiently rapidly so as to essentially prevent the venting of air through the exhaust port 40 of the valve 30 while the valve 30 is in its normal operating position. Secondly, upon the valve 30 being spooled to its actuated position, the extend side 54 of the cylinder 12 is subjected to high pressure air as provided by the high pressure regulator 22. As a result, the clamping force generated by the cylinder 12 through the welding electrode 14 is sufficiently increased to assure firm contact between the two or more metal sheets which typically constitute the workpiece 16, and proper electrical contact between the workpiece 16 and the welding electrode 14 occurs. A suitable electric current is then delivered to the welding electrode 14 which, in cooperation with its mating electrode (not shown), is sufficient to weld the workpiece 16.

After welding, the solenoid 26 to the operating valve 18 is de-energized, returning the operating valve 18 to the position shown in FIG. 1. As a result, high pressure air is delivered through the return line 20 to the retract side 52 of the cylinder 12, while the flow control system 10 is vented to the exhaust port 24 of the operating valve 18. The utility of the exhaust port 40 in the valve 30 now becomes evident. As the air pressure in the supply line 28 drops, the check valve 48 in the unidirectional flow control valve 44 opens, resulting in an immediate drop in pressure at the pilot of the valve 30, which allows the valve 30 to spool back to its normal operating position. As mentioned above, the second outlet port 38 is vented to the exhaust port 40 when the valve 30 is in the normal operating position. As a result, the speed at which the cylinder 12 is able to retract is increased by the ability of the air within the extend side 54 of the cylinder 12 to vent to atmosphere through the exhaust port 40 in the valve 30, instead of the exhaust port 24 in the operating valve 18. Consequently, the overall cycle time is reduced by the ability of the flow control system 10 of this invention to more rapidly exhaust the air to atmosphere at the end of the cycle.

For purposes of illustrating the operational characteristics of the flow control system 10 of this invention, tests conducted with a pair of dual-piston cylinders having a combined piston area of about 4.36 square inches and individual strokes of about 2 inches have resulted in the following cycle times according to the sequence descriptions described above.

Cycle Initiation to Impact: 0.158 seconds
Workpiece Impact to Spooling of Valve 30 (Full Clamp load): 0.119 seconds
Weld Operation (typical): about 1 second
Cylinder Retract: 0.090 seconds While these cycle times illustrate cycle times which can be achieved with the flow control system 10 of this invention, it is completely foreseeable that shorter and longer cycle times can result, particularly as result of the use of different cylinders, differing air line lengths and diameters, and different operating pressures.

From the above, it can be seen that a significant advantage of the flow control system 10 of this invention is that the flow control system 10 requires a minimal number of flow control devices to achieve comparable results, in terms of pressure regulation and cycle times, than much more complicated flow control systems are able to attain. The flow control system 10 is extremely compact and need only be inserted in the forward air supply line to a conventional pneumatic cylinder, allowing for the conversion of a standard cylinder into a low impact cylinder suitable for actuating a welding gun on an automated assembly line.

In addition, the flow control system 10 can be readily adjusted to allow for variances between different sizes of cylinders, different operating pressures and different welding operations. Specifically, suitable adjustments to the flow control system 10 can be made by adjusting the variable orifice 46 and the low pressure regulator 50 to achieve the desired sequence and timing necessary to avoid unnecessarily impacting the workpiece 16 with the welding electrode 14, while also minimizing the overall cycle time for the system. As a result, the flow control system 10 ensures that the desired clamping force will be applied subsequent to the workpiece 16 being engaged by the welding electrode 14, but prior to the actual welding of the workpiece 16, to ensure that a suitable weld is achieved.

Another significant advantage of the present invention is that the flow control device 10 is able to achieve the above advantages while having a minimal effect on the speed and operation of the cylinder 12. Specifically, the use of a single valve 30 for switching the cylinder 12 between the low and high pressures results in a faster responding flow control system 10. Furthermore, the compact size of the flow control system 10 allows the valve 30 to be placed in close proximity to the cylinder 12, which further enhances the response time of the flow control system 10. The ability to rapidly vent air from the cylinder 12 to atmosphere with the valve 30 also promotes a minimum overall weld cycle.

While the invention has been described in terms of a preferred embodiment, it is apparent that other forms could be adopted by one skilled in the art. For example, it is foreseeable that the preferred valve 30, low pressure regulator 50 and unidirectional flow control valve 44 could each be replaced with other suitable flow control devices, while still achieving the same operation and results as described above. In addition, the flow control system 10 of this invention could be modified to operate with a liquid, such as an oil, instead of air, and yet, with appropriate modifications, still achieve satisfactory results for some applications. Accordingly, the scope of the invention is to be limited only by the following claims.

What is claimed is:

1. A pressure control system for regulating a pressurized fluid between a supply source and a predetermined lower second pressure level, said pressurized fluid being supplied by said supply source to a cylinder that actuates a work performing device into engagement with a workpiece, said pressure control system comprising:

regulating means in fluidic communication with said supply source and said cylinder for regulating fluid flow from said supply source to said cylinder, said supply source having a first supply source pressure level, said regulating means being operable between a first position and a second position such that said cylinder is selectively in fluidic communication with said supply source when said regulating means is in both said first and second positions;

first means in fluidic communication with said regulating means and said cylinder for reducing the pressure of said pressurized fluid supplied to said cylinder from said first supply source pressure level to said second predetermined lower pressure level when said regulating means is in said first position, such that said pressurized fluid is delivered to said cylinder at said second predetermined lower pressure level; and second means in fluidic communication with said regulating means for urging said regulating means from said first position to said second position once said work performing device engages said workpiece, such that said pressurized fluid is delivered to said cylinder at said first supply source pressure level;

whereby said pressurized fluid is at said second predetermined lower pressure level when said regulating means is in said first position so as to stroke said work performing device into low impact engagement with said workpiece, and said pressurized fluid is at said first supply source pressure level when said regulating means is in said second position so as to increase an output load generated by said cylinder on said workpiece, said first supply source pressure level being higher than said second predetermined lower pressure level.

2. The pressure control system of claim 1 wherein said regulating means comprises a control valve having an inlet port in fluidic communication with said supply source, a first outlet port in fluidic communication with said cylinder through said first means, and a second outlet port in fluidic communication with said cylinder.

3. The pressure control system of claim 2 further comprising an exhaust port in said control valve, said exhaust port being in fluidic communication with said second outlet port when said control valve is in said first position, said exhaust port being closed when said control valve is in said second position.

4. The pressure control system of claim 3 further comprising pressure relief means in fluidic communication with said exhaust port.

5. The pressure control system of claim 1 wherein said second means comprises an orifice in fluidic communication with said supply source and said regulating means, said orifice being sized such that fluid flow through said orifice urges said regulating means from said first position to said second position after said work performing device engages said workpiece.

6. The pressure control system of claim 1 wherein said first means comprises a pressure regulator.

7. A pressure control system for regulating a fluid pressure to at least one cylinder which actuates a corresponding pair of electrodes into and out of engagement with a workpiece, said pressure control system comprising:

means for supplying a pressurized fluid to said at least one cylinder at a first pressure level;

flow regulating means in fluidic communication with said supply means and said at least one cylinder for regulating flow of said pressurized fluid from said supply means to said at least one cylinder, said supply means having a first supply pressure level, said flow regulating means being operable between a first position and a second position such that said at least one cylinder is selectively in fluidic communication with said supply means when said flow regulating means is in both said first and second positions;

first means in fluidic communication with said flow regulating means and said at least one cylinder for reducing said fluid pressure supplied to said cylinder from said first supply pressure level to a second lower pressure level when said flow regulating means is in said first position, such that said pressurized fluid is delivered to said at least one cylinder at said second lower pressure level; and second means in fluidic communication with said flow regulating means for urging said flow regulating means from said first position to said second position, such that said pressurized fluid is delivered to said at least one cylinder at said first supply pressure level;

whereby said fluid pressure is at said second lower pressure level when said flow regulating means is in said first position so as to stroke said pair of electrodes into low impact engagement with said workpiece, and said fluid pressure is at said first supply pressure level when said flow regulating means is in said second position so as to increase a clamping load generated by said at least one cylinder on said workpiece.

8. The pressure control system of claim 7 wherein said flow regulating means comprises a control valve having an inlet port in fluidic communication with said supply means, a first outlet port in fluidic communication with said at least one cylinder through said first means, and a second outlet port in fluidic communication with said at least one cylinder.

9. The pressure control system of claim 8 wherein said inlet port is in fluidic communication with said first outlet port when said control valve is in said first position, and wherein said inlet port is in fluidic communication with said second outlet port when said control valve is in said second position.

10. The pressure control system of claim 8 further comprising an exhaust port in said control valve, said exhaust port being in fluidic communication with said second outlet port when said control valve is in said first position, said exhaust port being closed when said control valve is in said second position.

11. The pressure control system of claim 10 further comprising pressure relief means in fluidic communication with said exhaust port.

12. The pressure control system of claim 7 wherein said second means comprises an orifice in fluidic communication with said supply means and said flow regulating means, said orifice being sized such that fluid flow through said orifice urges said flow regulating means from said first position to said second position after said pair of electrodes engage said workpiece.

13. The pressure control system of claim 7 wherein said first means comprises a pressure regulator.

14. The pressure control system of claim 7 wherein said second lower pressure level is no more than about 15 psig.

15. A method for engaging a workpiece with a pair of welding electrodes which are actuated by at least one corresponding cylinder with a fluid at a first pressure level, and then clamping said workpiece with said pair of welding electrodes while said at least one cylinder is under the influence of said fluid at a second pressure level which is higher than said first pressure level, said method comprising the steps of:

supplying said fluid at said second pressure level from a fluid source to a flow regulating device;

reducing the pressure of said fluid from said second pressure level to said first pressure level while said fluid flows through a first passage when said flow regulating device is in a first position;

monitoring the flow of said fluid through said flow regulating device and said first passage such that said fluid is delivered to said at least one cylinder through said first passage, whereby said pair of welding electrodes engage said workpiece while said at least one cylinder is stroked under the influence of said fluid at said first pressure level; and urging said flow regulating device to a second position once said pair of welding electrodes has engaged said workpiece such that said fluid is delivered at said second pressure level to said at least one cylinder through a second passage to enable said at least one cylinder to apply a clamping load to said workpiece;

whereby undesirable impacting of said pair of welding electrodes against said workpiece is substantially avoided by initially engaging said workpiece with said pair of welding electrodes while said at least one cylinder is under the influence of said fluid at said first pressure level so as to initially engage said workpiece with a force which is less than said clamping load.

16. The method of claim 15 wherein the step of urging said flow regulating device to said second position comprises supplying said fluid at said second pressure level through an orifice to said flow regulating device, such that fluid pressure downstream of said orifice sufficiently increases so as to urge said flow regulating device from said first position to said second position.

17. The method of claim 16 wherein the rate at which said fluid is supplied to said flow regulating device through said orifice increases once said pair of welding electrodes engages said workpiece.

18. The method of claim 15 further comprising the steps of venting said fluid from said at least one cylinder through said flow regulating device by venting said fluid at said fluid source.

19. The method of claim 18 wherein said step of venting causes said flow regulating device to return to said first position, such that said fluid is vented through an exhaust port in said flow regulating device.

20. The method of claim 15 wherein said step of reducing the pressure of said fluid includes regulating said first pressure level to a pressure of no more than about 15 psig.

* * * * *

UNITED STATES PATENT AND TRADEMARK OFFICE

CERTIFICATE OF CORRECTION

PATENT NO. : 5,349,151 Page 1 of 2
DATED : September 20, 1994
INVENTOR(S) : Ronald J. Eisbrenner and George V. Fantazian It is certified that error appears in the above-indentified patent and that said Letters Patent is hereby corrected as shown below:

Column 2, line 21, delete "sheet" insert ---- sheets ----.

Column 3, line 60, after "position" insert ---- , ----.

Column 6, line 22, delete "operates" insert ---- operated ----.

Column 7, line 58, delete ---- flow ----.

Column 7, line 59, after "unidirectional" insert ---- flow ----.

Column 8, line 2, after "the" insert ---- unidirectional ----.

Column 8, line 49, after "vented" insert ---- to ----.

Column 8, line 65, delete "route" insert ---- routes ----.

Column 8, line 67, delete "55" insert ---- 56 ----.

Column 10, line 39, after "as" insert ---- a ----.

UNITED STATES PATENT AND TRADEMARK OFFICE

CERTIFICATE OF CORRECTION

PATENT NO. : 5,349,151

DATED : September 20, 1994

INVENTOR(S) : Ronald J. Eisbrenner and George V. Fantazian

It is certified that error appears in the above-indentified patent and that said Letters Patent is hereby corrected as shown below:

Column 11, line 30, after "source" insert ---- having a first pressure level ----.

Column 11, line 37, delete ---- said ---- third occurrence.

Column 11, line 38, delete ---- supply source having a first supply source pressure ----.

Column 11, line 39, delete ---- level, ----.

Signed and Sealed this

Twenty-ninth Day of November, 1994

Attest:

BRUCE LEHMAN

Attesting Officer

*Commissioner of Patents and Trademarks*